United States Patent [19]

Mazo

[11] Patent Number: 4,489,418
[45] Date of Patent: Dec. 18, 1984

[54] DIFFERENTIAL ENCODING TECHNIQUE

[75] Inventor: James E. Mazo, Fair Haven, N.J.

[73] Assignee: AT&T Bell Laboratories, Murray Hill, N.J.

[21] Appl. No.: 486,080

[22] Filed: Apr. 18, 1983

[51] Int. Cl.³ ............................................ H04L 25/16
[52] U.S. Cl. ...................................... 375/27; 375/38; 375/39
[58] Field of Search ........................ 375/27, 38, 39, 56, 375/84; 371/43, 44, 45; 332/9 R, 21, 40, 42; 329/104, 105

[56] References Cited

U.S. PATENT DOCUMENTS

| 4,084,137 | 4/1978 | Welti ...................................... 375/38 |
| 4,114,710 | 9/1979 | Katoh et al. ........................... 375/39 |
| 4,141,034 | 2/1979 | Netravali et al. ...................... 375/27 |

OTHER PUBLICATIONS

"Channel Coding with Multilevel/Phase Signals," *IEEE Trans. Information Theory*, G. Ungerboeck, Jan. 1982, pp. 55–67.

"The Viterbi Algorithm," *Proc. of IEEE*, G. D. Forney, Jr., Mar. 1973, pp. 268–278.

*Primary Examiner*—Benedict V. Safourek
*Attorney, Agent, or Firm*—Ronald D. Slusky

[57] ABSTRACT

A stream of data to be transmitted is arranged in n streams of 2-bit words. Successive pairs of bits in each of those streams are differentially encoded by generating for each different combination of their values a predetermined one of the differentially encoded bit pairs $(i,q)$, $(\bar{q},i)$, $(\bar{i},\bar{q})$ and $(q,\bar{i})$ associated with that combination, where $(i,q)$ is the previously generated differentially encoded bit pair. Words each comprised of the first (second) bit of a respective bit pair in each of the resulting n differentially encoded streams are then provided as n-bit words in a first (second) input stream for a two-dimensional channel coder. In the receiver, the channel decoder provides first and second streams of n-bit words. The bits of the latter are then arranged such that each word in the first (second) stream of channel-decoded words becomes the first (second) bit of a differentially encoded bit pair in a respective one of n differentially encoded bit pair streams. The pairs of bits in each of the n differentially encoded streams are then differentially decoded to recover the original data.

10 Claims, 8 Drawing Figures

| $a_1$ | $a_2$ | $a_3$ | $a_5$ | CODED VALUE |
|---|---|---|---|---|
| 0 | 0 | 0 | 0 | 7 |
| 0 | 0 | 0 | 1 | 3 |
| 0 | 0 | 1 | 0 | 1 |
| 0 | 0 | 1 | 1 | 5 |
| 0 | 1 | 0 | 0 | -1 |
| 0 | 1 | 0 | 1 | -5 |
| 0 | 1 | 1 | 0 | -7 |
| 0 | 1 | 1 | 1 | -3 |
| 1 | 0 | 0 | 0 | 3 |
| 1 | 0 | 0 | 1 | 7 |
| 1 | 0 | 1 | 0 | 5 |
| 1 | 0 | 1 | 1 | 1 |
| 1 | 1 | 0 | 0 | -5 |
| 1 | 1 | 0 | 1 | -1 |
| 1 | 1 | 1 | 0 | -3 |
| 1 | 1 | 1 | 1 | -7 |

FIG. 6

FIG. 7
DIFFERENTIAL ENCODING

|  | PREVIOUS DIFFERENTIAL ENCODER OUTPUT PAIR | | | |
|---|---|---|---|---|
|  | 00 | 10 | 11 | 01 |
| 00 | 00 | 10 | 11 | 01 |
| 10 | 10 | 11 | 01 | 00 |
| 11 | 11 | 01 | 00 | 10 |
| 01 | 01 | 00 | 10 | 11 |

NEW DIFFERENTIAL ENCODER INPUT PAIR (row labels)

FIG. 8
DIFFERENTIAL DECODING

|  | PREVIOUS DIFFERENTIAL DECODER INPUT PAIR | | | |
|---|---|---|---|---|
|  | 00 | 10 | 11 | 01 |
| 00 | 00 | 01 | 11 | 10 |
| 10 | 10 | 00 | 01 | 11 |
| 11 | 11 | 10 | 00 | 01 |
| 01 | 01 | 11 | 10 | 00 |

NEW DIFFERENTIAL DECODER INPUT PAIR (row labels)

DIFFERENTIAL ENCODING TECHNIQUE

BACKGROUND OF THE INVENTION

When synchronous data is transmitted over a channel that is subject to so-called phase hits, the receiver may recover from a phase hit in such a way that the data symbols thereafter received are rotated from their original positions in the signal constellation. In order to recover the transmitted data correctly in the event of such rotations, it is conventional to differentially encode the data, which means that each data word to be transmitted is represented not by a particular data symbol, but rather, by the angular difference in the signal constellation between two successive transmitted symbols. Since a rotation affects all symbols equally, the relative positions in the signal constellation of successive received symbols remains the same, and the transmitted data can still be correctly recovered.

When the channel coder implements a so-called block code, the desired differential encoding can be achieved by, for example, processing in an appropriate way those bits in each channel coder input word whose values determine the quadrant within the signal constellation of the transmitted symbol. Such an approach will not work, however, if other types of channel codes, such as certain so-called trellis codes, are used.

SUMMARY OF THE INVENTION

The present invention is directed to a differential encoding technique which can, in fact, be used in conjunction with channel codes for which conventional differential coding will not work. More particularly, this technique is adapted for use in conjunction with a two-dimensional channel coder of the type in which the in-phase and quadrature-phase coder outputs are independently generated in response to predetermined bits in respective data streams, and in which the coder output generated when each of those bits has a particular value is the negative of the coder output generated when each of those bits has its other value.

In accordance with the differential encoding technique, the data to be transmitted is arranged in n streams of bit pairs. Successive pairs of bits in each of those streams are appropriately differentially encoded, i.e., converted to an associated differentially encoded bit pair, to form n streams of differentially encoded bit pairs. Words each comprised of the first (second) bit of a respective bit pair in each of the n differentially encoded streams are then provided as the n-bit input words of the first (second) channel coder input stream. In accordance with a feature of the invention, each of the successive pairs of bits in each of the n streams of pairs is differentially encoded by generating for each different combination of their values a predetermined one of the differentially encoded bit pairs $(i,q)$, $(\bar{q},i)$, $(\bar{i},\bar{q})$ and $(q,\bar{i})$ associated with that combination, where $(i,q)$ is the previously generated differentially encoded bit pair.

In the receiver, the channel decoder provides first and second streams of n-bit words. The bits of the latter are then arranged such that each bit in each word in the first (second) stream of channel-decoder words becomes the first (second) bit of a differentially encoded bit pair in a respective one of n differentially encoded bit pair streams. The pairs of bits in each of the n differentially encoded streams are then differentially decoded to recover the original data.

DETAILED DESCRIPTION

Figure 1:
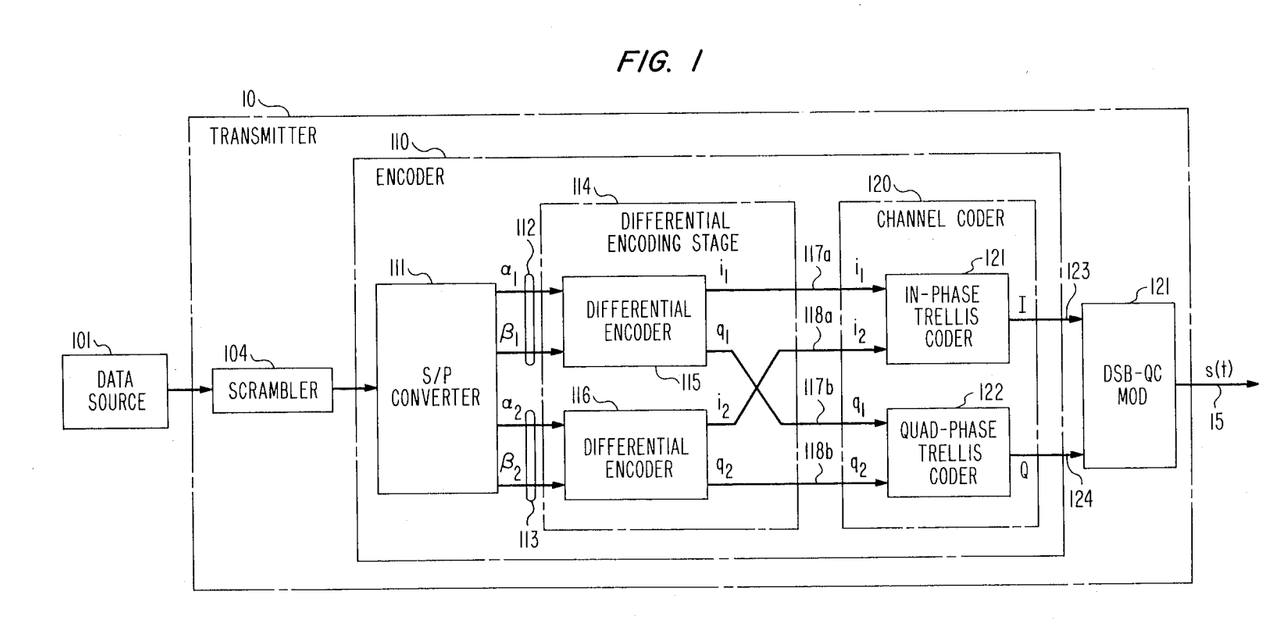
FIG. 1 is a block diagram of a data transmitter which includes a differential encoding stage embodying the principles of the invention.

Transmitter 10 of FIG. 1 includes a scrambler 104, encoder 110 and double sideband-quadrature carrier (DSB-QC) modulator 121. Scrambler 104, in particular, receives a stream of binary data from a data source 101 which may be, for example, a digital computer. Scrambler 104 pseudo-randomizes the data to prevent concentrations of energy across the spectrum of the bandpass signal ultimately to be generated. The output of scrambler 104 is a serial bit stream which is applied to encoder 110 at the rate 2n/T bits/second, where T is a predetermined baud interval and n is an integer illustratively equal to 2.

Encoder 110 is comprised of a serial-to-parallel converter 111, differential encoding stage 114 and channel coder 120. Serial-to-parallel converter 111 converts the bit stream received from scrambler 104 into n=2 parallel streams of 2-bits data words provided on leads 112 and 113, respectively—the data bit pair on leads 112 being denoted $(\alpha_1, \beta_1)$ and the data bit pair on leads 113 being denoted $(\alpha_2, \beta_2)$. The words on leads 112 and 113 are received, and differentially encoded, by differential encoding stage 114 in accordance with the principles of the invention, as hereinafter described. For the present it suffices to note only that differential encoding stage 114 provides a first stream of 2-bit words on leads 117a and 118a and a second stream of 2-bit words on leads 117b and 118b, a word being provided on each of these lead pairs for each baud interval. As also discussed more fully hereinbelow, channel coder 120 responds to the two streams of 2-bit words provided by differential encoding stage 114 by generating for each baud interval a pair of signal real numbers on cables 123 and 124. These numbers represent the in-phase and quadrature-phase components of a particular two-dimensional data symbol of a predetermined signal constellation. Cables 123 and 124 extend to modulator 121, which generates a double sideband-quadrature carrier signal whose in-phase and quadrature-phase carriers have as their respective amplitudes (for the duration of the current baud interval) the in-phase and quadrature-phase components on cables 123 and 124. The DSB-QC signal thus generated is applied to a transmission channel 15 as signal s(t).

Figure 2:
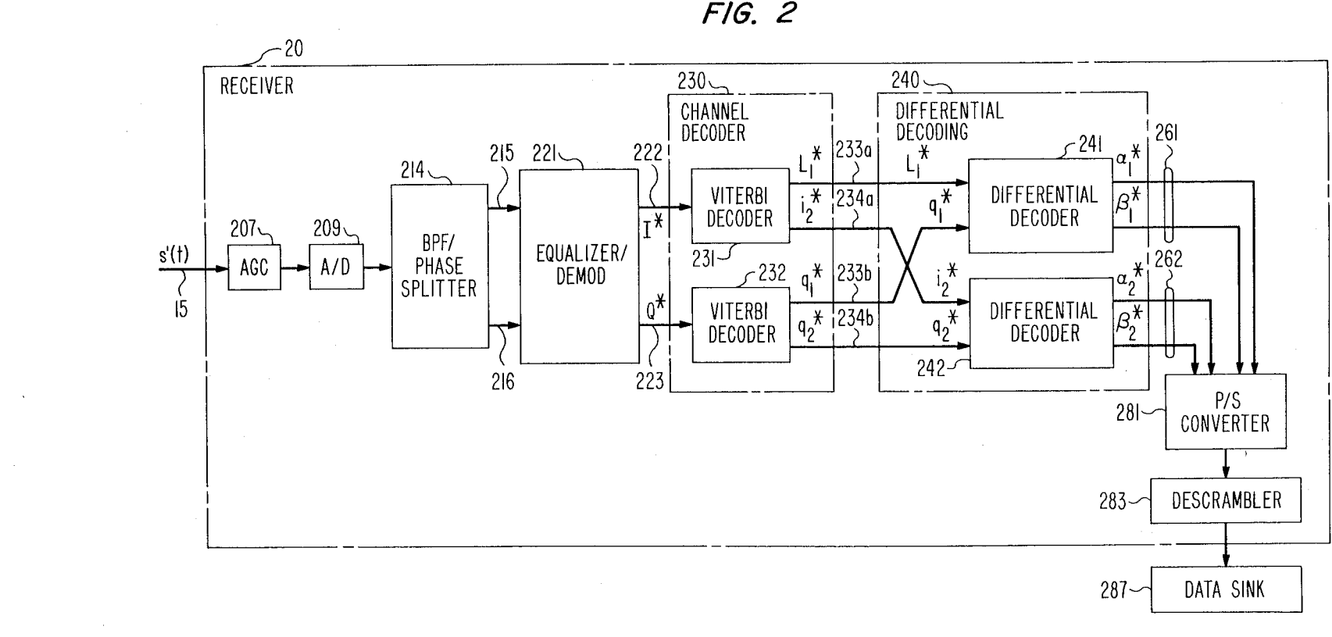
FIG. 2 is a block diagram of a data receiver which includes a differential decoding stage embodying the principles of the invention.

Signal s(t) is corrupted in channel 15 by such impairments as Gaussian noise, phase jitter, frequency offset and intersymbol interference. As shown in FIG. 2, the received corrupted signal s'(t) is applied to automatic gain control (AGC) circuit 207 within receiver 20 and thence to A/D converter 209. The resulting digital samples are applied to bandpass filter/phase splitter 214. The latter provides two outputs on leads 215 and 216, these being a digital bandpass-filtered version of the A/D converter output and the Hilbert transform of same, respectively.

The signals on leads 215 and 216 are applied to equalizer/demodulator 221, which, for each baud interval T, provides on its output leads 222 and 223 first and second baseband equalizer outputs respectively associated with the in-phase and quadrature-phase components of a particular transmitted data symbol. Because the equalizer cannot perfectly compensate for all channel impairments, the values of the baseband equalizer outputs are not, in general, whole integers, even though the transmitted in-phase and quadrature-phase components are illustratively integer-valued. It thus remains to determine from the baseband equalizer outputs what the transmitted in-phase and quadrature-phase components—and thence the 2-bit words which they represent—most likely were. This is the task of channel decoder 230, which provides a first stream of 2-bit words on its output leads 233a and 234a and a second stream of 2-bit words on its output leads 233b and 234b. Unless there was a transmission error that the receiver was not able to compensate for, these streams of 2-bit words should be identical to the streams of 2-bit words provided to channel coder 120 in the transmitter on leads 117a and 118a and leads 117b and 118b, respectively.

The words on leads 233a–b and 234a–b are differentially decoded by differential decoder 240 in accordance with the principles of the invention, as hereinafter described, to provide n=2 parallel streams of 2-bit words on leads 261 and 262, respectively. Again assuming no uncompensated transmission error, these should be identical to the streams of 2-bit words on leads 112 and 113 in the transmitter, respectively. Leads 261 and 262 extend to parallel/serial converter 281. The serial output of the latter is descrambled in descrambler 283 and the descrambled bit stream is applied to data sink 287. The latter may be, for example, a digital computer or computer terminal.

Prior to explaining the principles of the invention, it is convenient to discuss channel coder 120 and channel decoder 230 in greater detail.

Figure 3:
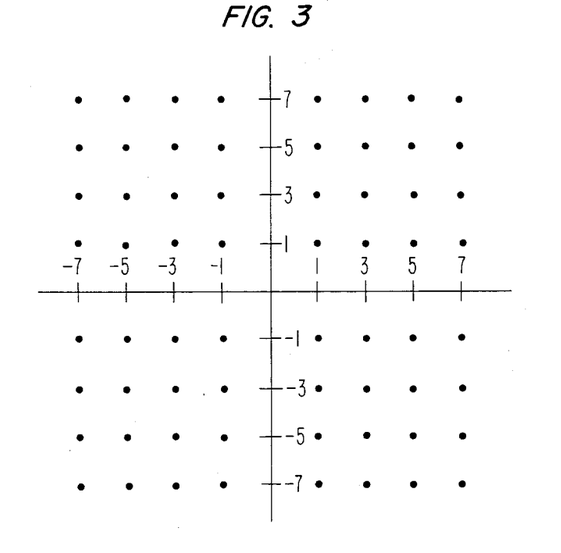
FIG. 3 depicts the signal constellation generated by the channel coder within the transmitter of FIG. 1.

Channel coder 120, in particular, is illustratively comprised of first and second identical trellis coders 121 and 122. Trellis coder 121 receives the 2-bit input words on leads 117a and 118a and, in response exclusively thereto, generates the in-phase data symbol components on cable 123. Trellis coder 122 receives the 2-bit input words on leads 117b and 118b and, in response exclusively thereto, generates the quadrature-phase data symbol components on cable 124. As is described, for example, in G. Underboeck, "Channel Coding with Multilevel/Phase Signals," IEEE Trans. Inform. Theory, IT-28, No. 1 (January, 1982), pp. 55–67 and in the copending U.S. patent application of H. K. Thapar, Ser. No. 455,502, filed Jan. 4, 1983 and assigned to the assignee hereof, each coded value generated by a trellis coder is a function of not only the current input bits but also of a predetermined subset of past bits. More particularly, the data symbol component, or coder output, X generated by the particular trellis code implemented by each of trellis coders 121 and 122 is given by the following:

$$X = b_3 + 2b_1 b_3 b_5 + 4b_2 \tag{1}$$

where $$b_i = (-1)^{a_i} \text{ for } i=1,2,3,5 \tag{2}$$

and where $a_1$ and $a_2$ are the bits of the 2-bit word currently applied to the coder, $a_3$ is the first bit in the 2-bit word previously applied to the coder and $a_5$ is the first bit in the 2-bit word applied to the coder previous to that. Note that (2) simply translates the bits $a_i$, each of whose values is either 0 to 1, into real numbers $b_i$, each of whose values is either 1 or −1, and (1) then gives the codeword component X in terms of the $b_i$'s. As can be seen from (1) and (2), the coder outputs put out by trellis coder 121 (122) as the in-phase (quadrature-phase) components on cable 123 (124) can be any one of the eight values ±1, ±3, ±5, ±7. The DSB-QC signal generated by modulator 131 can thus represent any one of $8^2 = 64$ signal points, as shown in FIG. 3 because the in-phase and quadrature-phase components are generated independently.

Figure 4:
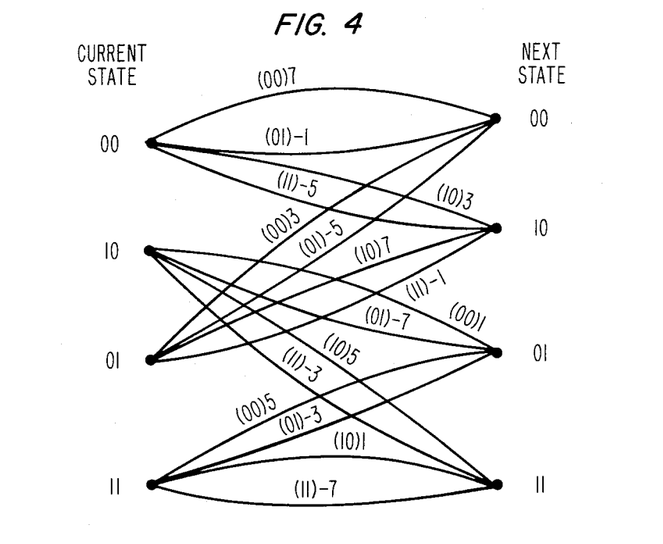
FIG. 4 is a trellis diagram associated with trellis coders within the channel coder.

In addition to (1) and (2) above, the trellis code can also be expressed by the trellis diagram of FIG. 4. The bit groups on the left of the trellis diagram represent the various possible "states" of the coder at any given time and, for the code in question, correspond to the four possible combinations of the values of bits $a_3$ and $a_5$. Given a particular state of the coder, each of the trellis segments emanating from that state corresponds to a different possible combination of the bits of the current input bits $a_1$ and $a_2$. The latter are indicated in the diagram by the bit pair shown in parentheses, along with the corresponding coder output. The termination point of each line in the trellis diagram indicates the coder state for the next baud interval, the old $a_1$ becoming the new $a_3$ and the old $a_3$ becoming the new $a_5$.

Figure 5:
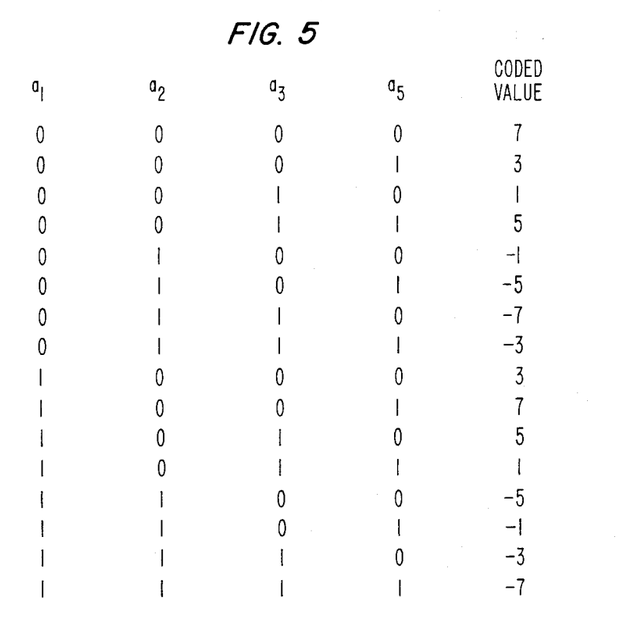
FIG. 5 is a table showing the coded values generated by each trellis coder.

Trellis coders 121 and 122 can be implemented in any of several ways, such as with a read-only memory lookup table whose inputs are the four bits $a_1$, $a_2$, $a_3$ and $a_5$, such a table being shown in FIG. 5, or with circuitry which computes the coder outputs in accordance with (1) and (2) above.

We turn, now, to channel decoder 230 in the receiver. If the type of channel coding implemented by channel coder 120 were, for example, conventional two-dimensional block coding, the process of deciding what each transmitted component value was would be simply one of determining which of the possibly-transmitted component values ±1, ±3, ±5, ±7 is numerically closest to the each baseband equalizer output on a respective one of leads 222 and 223. If, for example, the output of equalizer/demodulator 221 on lead 222 is −2.4, then, by this straightforward technique, often referred to as slicing, the in-phase component value that was transmitted would be assumed to be −3.

As already noted, however, the type of channel coding implemented by channel coder 120 is trellis coding, and the principal advantage of using trellis coding—enhanced noise immunity—is not realized if the baseband equalizer outputs are simply sliced. Rather, that advantage is realized only when the decision as to what the transmitted data symbol component was takes into account not only the value of the current baseband equalizer output, but also the values of a selected number of (e.g., ten) prior baseband equalizer outputs. This is illustratively accomplished using the so-called Viterbi algorithm and, to this end, channel decoder 230 is comprised of first and second Viterbi decoders 231 and 232 which decode the in-phase and quadrature-phase baseband equalizer outputs on leads 222 and 223 using the Viterbi algorithm. Viterbi decoders 231 and 232 may be of conventional design and need not be described in further detail. See, for example, G. D. Forney, Jr., "The Viterbi Algorithm," *Proc. of IEEE*, Vol. 61, No. 3, March 1973, pp. 268–278.)

(The equalizer within equalizer/demodulator 221 is illustratively a conventional adaptive equalizer whose tap coefficients are updated in response to an error signal formed as the difference between each in-phase and quadrature-phase baseband equalizer output and a decision as to the component value represented thereby. Reasonably good equalization can be achieved even if the decisions used to form the error signals are simply sliced versions of the baseband equalizer outputs and this is, in fact, the approach taken in the present illustrative embodiment. It will thus be appreciated that, in addition to the usual equalization and demodulation circuitry, equalizer/demodulator 221 may include a slicing circuit for its own internal use. Alternatively, however, the decisions used to form the error signals may be the Viterbi decoder outputs. This approach should yield somewhat better error performance of the equalizer since it provides a more accurate error stream. Due to the processing delay in the Viterbi decoders, however, the adaptation step size used in the equalizer's tap coefficient update algorithm may need to be smaller than in the first case, yielding a somewhat reduced ability to track time-varying changes in the channel.)

At this point, we now observe a further property of the particular trellis code in question—a property that is significant in the context of the present invention. That property is that the coder output generated when each of the bits which determine it has a particular value, i.e., bits $a_1$, $a_2$, $a_3$ and $a_5$, is the negative of the coder output generated when each of those bits has its other value. Thus, as can be seen from FIG. 5, for example, if $a_1$, $a_2$, $a_3$ and $a_5$ have the values 0, 1, 0, 0, then the coder output is $-1$. If, on the other hand, each of those bits has the complement of those values, i.e., 1, 0, 1, 1, then the coder output is the negative of $-1$, viz., $+1$. That this property holds for all possible combinations of bits $a_1$, $a_2$, $a_3$, $a_5$ can be immediately seen from (1) and (2) hereinabove inasmuch as each term of (1) has an odd number of variables.

Given that the code used to generate both the in-phase and quadrature-phase components has this property, as well as the property that those components are generated independently, i,e., exclusively in response to bits in respective associated bit streams, I have discovered that the bits to be transmitted can be differentially encoded in the following way:

(a) differentially encode successive pairs of bits in each of n streams of pairs of bits to be transmitted to form n streams of differentially encoded bit pairs; and (b) provide as each n-bit input word for one of the in-phase and quadrature-phase coders a word comprised of the first bit of a respective bit pair in each of the n differentially encoded streams and provide as each n-bit word for the other of the in-phase and quadrature-phase coders a word comprised of the second bit of that respective bit pair.

In the receiver, the original bit stream is recovered by (a) arranging the bits of the first and second streams of channel-decoded n-bit words such that each bit in each word in the first (second) stream becomes the first (second) bit of a differentially encoded bit pair in a respective one of n differentially encoded bit pair streams, and (b) differentially decoding the pairs of bits in each of the streams of channel-decoded bit pairs thus provided.

In implementing the foregoing, differential encoding stage 114 in the transmitter of FIG. 1 includes n=2 differential encoders 115 and 116, which differentially encode the bit pairs on leads 112 (113) to form a stream of differentially encoded bit pairs on leads 117a and 117b (118a and 118b). As previously noted, the 2-bit input words for trellis coder 121 are provided on leads 117a and 118a, while the 2-bit input words for trellis coder 122 are provided on leads 117b and 118b. In conformity with the foregoing, then, the input word for trellis coder 121 (122) in each baud interval is comprised of the first (second) bit of the current output pair of each differential encoder.

Similarly in the illustrative receiver of FIG. 2, then n=2 bits of each output word from Viterbi decoder 231 (232) are provided on leads 233a and 234a (233b and 234b) as the first (second) bits of the input words for differential decoders 241 and 242 within differential decoding stage 240.

It remains now to be seen how the above-described structure allows the system to recover from phase hits on the channel.

Assume, in particular, that as shown in FIG. 1, the transmitted symbol has in-phase and quadrature-phase components, or coder outputs, I and Q on cables 123 and 124, respectively, which were generated upon the application to trellis coders 121 and 122 of words comprised of the bits $(i_1, \ldots, i_n)$ and $(q_1, \ldots, q_n)$, respectively—in this case the bit pairs $(i_1, i_2)$ and $(q_1, \text{ and } q_2)$. As a matter of notation, then, the output bit pairs of differential encoders 115 and 116 are $(i_1, q_1)$ and $(i_2, q_2)$, respectively. Assume further, for purposes of simplicity, that equalizer/demodulator 221 in receiver 20 is able to perfectly compensate for all channel impairments and disturbances other than symbol rotations. Accordingly, a rotation of the signal constellation as the result of a phase hit, for example, results in the following the in-phase and quadrature-phase components (I*, Q*) on leads 222 and 223, respectively, for the four possible rotations 0, 90, 180 and 270 degrees:

|  |  | Received Symbol | |
|---|---|---|---|
|  |  | I* | Q* |
| Rotation (degrees) | 0 | I | Q |
|  | 90 | −Q | I |
|  | 180 | −I | −Q |
|  | 120 | Q | −I |

As a result of the above-noted property of the channel code, the Viterbi decoder 2-bit output words $(i_1^*, i_2^*)$ and $(q_1^*, q_2^*)$ for the four possible cases of rotation are as follows:

|  |  | Channel-Decoded Words | |
|---|---|---|---|
|  |  | $i^*_1, i^*_2$ | $q^*_1, q^*_2$ |
| Rotation (degrees) | 0 | $i_1, i_2$ | $q_1, q_2$ |
|  | 90 | $\bar{q}_1, \bar{q}_2$ | $i_1, i_2$ |

-continued

| | Channel-Decoded Words | |
|---|---|---|
| | $i^*_1, i^*_2$ | $q^*_1, q^*_2$ |
| 180 | $\bar{i}_1, \bar{i}_2$ | $\bar{q}_1, \bar{q}_2$ |
| 270 | $q_1, q_2$ | $i_1, i_2$ |

The 2-bit words appearing at the inputs of differential decoders 241 and 242 are therefore the following:

| | | Differential Encoder Input Words | |
|---|---|---|---|
| | | $(i^*_1, q^*_1)$ | $(i^*_2, q^*_2)$ |
| Rotation (degrees) | 0 | $i_1, q_1$ | $i_2, q_2$ |
| | 90 | $\bar{q}_1, i_1$ | $q_2, i_2$ |
| | 180 | $\bar{i}_1, \bar{q}_1$ | $\bar{i}_2, \bar{q}_2$ |
| | 270 | $q_1, \bar{i}_1$ | $q_2, \bar{i}_2$ |

Figure 6:
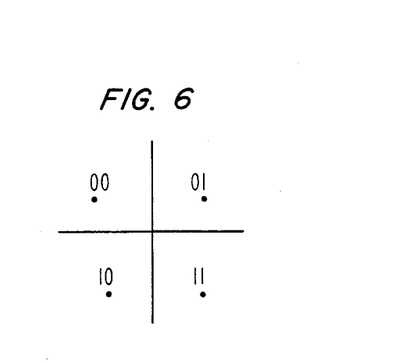
FIG. 6 is a model showing how the bits applied to the channel coder in the transmitter are transformed by symbol rotation in the channel.

What we learn from the foregoing is that the bit pair $(i_j, q_j)$ undergoes a transformation whereby, at the input of the respective differential decoder, it becomes the bit pair $(i_j, q_j)$, $(\bar{q}_j, i_j)$, $(\bar{i}_j, \bar{q}_j)$ and $(q_j, \bar{i}_j)$ for symbol rotations of 0, 90, 180 and 270 degrees, respectively. This is represented graphically in FIG. 6, which is a model showing how the bits transform as a function of symbol rotation. Note, for example, that when the point $(i_j, q_j)$ is (0,0), a rotation of 90 degrees (counterclockwise) leads to (1,0) which, in fact, is the point $(\bar{q}_j, i_j)$. Similarly, if the point $(i_j, q_j)$ is (1,1), a rotation of 180 degrees leads to (0,0) which, in fact is the point $(\bar{i}_j, \bar{q}_j)$ and so forth. And given that each of the four different possible symbol rotations results in a particular transformation of the transmitted bits, and given that that transformation is independent of the values of those bits, we recognize that such rotations in the channel can be dealt with using differential encoding.

In particular, given our model of how the bit values transform under symbol rotation, we can readily arrive at a specific differential encoding scheme for use in differential encoders 115 and 116 and a corresponding differential decoding scheme for use in differential decoders 241 and 242. (In many prior art differential encoding arrangements, there may be more than one applicable rotation model because there is at least some freedom in assigning particular combinations of transmitted bits to particular symbols in the signal constellation. In the present application, however, the above-discussed properties of thhe channel code and the manner in which the differential encoders and trellis coders are interconnected result in a particular one rotation mode, i.e., the mode of FIG. 6.)

In particular, we first assign a different phase advance in the model to each different combination of the values of the input bits to be differentially encoded. In the present example, in particular, we can arbitrarily choose the phase advances 0, 90, 180 and 270 to represent the differential encoder input pair values (0,0), (1,0), (1,1) and (0,1), respectively. (Although particular schemes may be more amenable than others to simple hardware realization of the differential encoder and decoder, it is to be emphasized that phase advance/input value assignment can be made arbitrarily.) To determine the differential encoder output for a particular input pair value, we begin at the point in the model of FIG. 6 associated with the previously generated differential encoder output and then advance in the model by the amount assigned to the input pair value.

Stated more formally, the differential encoder differentially encodes each pair of input bits by generating for each different combination of the values of the input bits a predetermined one of the differentially encoded bit pairs (i,q), $(\bar{q},i)$, $(\bar{i},\bar{q})$ and $(q,\bar{i})$ associated with that combination, where (i,q) is the previously generated differentially encoded bit pair. Thus, in terms of the notation of FIG. 1, we convert each $(\alpha_j, \beta_j)$ in the $j^{th}$ stream of data bit pairs $j=1,\ldots,n$, by generating for each different combination of the values of those input bits a predetermined one of the differentially encoded bit pairs $(i_j, q_j)$, $(\bar{q}_j, i_j)$, $(\bar{i}_j, \bar{q}_j)$ and $(q_j, \bar{i}_j)$ associated with that combination, where $(i_j, q_j)$ is the differentially encoded bit pair (output of the differential encoder) associated with the previous data bit pair in the $j^{th}$ stream.

Figure 7:
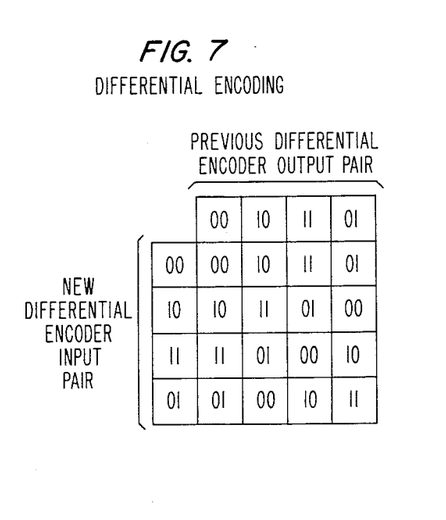
FIG. 7 is a table showing the differential encoding scheme used by the differential encoders within the transmitter.

For example, assume that the input pair to be encoded is (0,1) and that the previously generated differential encoder output was (1,0). Since (0,1) has the assigned phase advance of 270 degrees, we advance from the point (1,0) in the model by 270 degrees. This takes us to the point (0,0), which is the new differential encoder output. Following this methodology for all possible combinations of differential encoder input pairs and output pairs results in the table of FIG. 7, which shows how each one of differential encoders 115 and 116 maps input pairs to differentially encoded output pairs as a function of the previous output pair. (A different assignment of phase advances to particular input bit pair values simply results in a rearrangement of the bit pairs in the left-most column of the table.) The differential encoders are illustratively realized as respective readonly memories implementing the table of FIG. 7, with the output of each ROM being fed back, with a one-baud delay, to the ROM input along with the new input pair.

Within differential decoders 241 and 242, the relative positions in the model of each successive pair of received differentially encoded bits determines what the original data was. Thus, continuing with the above example, reception of the differentially encoded bit pairs (1,0), (0,0) means that the original data pair was the data pair associated with a 270 degree phase advance in the model—namely the pair (0,1). Note that if there had been a phase hit resulting in a symbol rotation of, for example, 180 degrees, the differential decoder inputs, instead of being (1,0) and (0,0), would have been (0,1) and (1,1), respectively. However, since these bit pairs are still separated by 270 degrees, the original data is recovered correctly, notwithstanding the phase hit and consequent symbol rotation.

Figure 8:
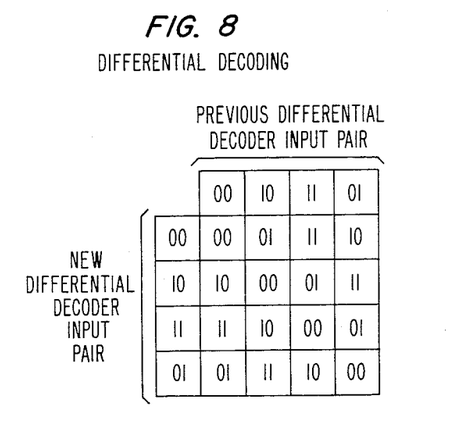
FIG. 8 is a table showing the differential decoding scheme used by the differential decoders within the receiver.

FIG. 8 shows how each one of differential decoders 241 and 242 maps each input pair to a differentially decoded output pair as a function of that input pair and the previous input pair. Like the differential encoders, the differential decoders are illustratively realized as respective read-only memories, with one of the inputs to the ROM being a pair of differentially encoded bits provided from channel decoder 230 and the other of the inputs to the ROM being a one-baud-delayed version of the first.

The foregoing merely illustrates the principles of the invention. For example, it is not limited to use in conjunction with trellis codes but, rather, can be used with any channel code which meets the criteria that the in-phase and quadrature-phase coder outputs are generated independently and that the coder output generated when the relevant input bits have particular values is the negative of the coder output generated when each of those bits has its other, complemented value. In the context of block coding, in particular, the coder output generated in response to the predetermined input bits may be, not a single numerical value, as in the present illustrative embodiment, but, rather, a block of two or more values. In such contexts, the "negative" of a particular coder output is a block each of whose values has the same magnitude as before, but the opposite sign.

In addition, the invention can be implemented with any value of $n \geq 2$, not just $n=2$, the value of n being dictated by the selected channel code. For the case of $n=3$, for example, the differential encoding (decoding) stage would include three differential encoders (decoders) each of whose outputs (inputs) would be applied to (taken from) a respective one of the in-phase and quadrature-phase coders (decoders).

Additionally, the various streams of data bit pairs, differentially encoded bit pairs, etc., need not necessarily be provided on any particular number of physically distinct leads but, rather, may be streams that are interleaved on a single lead or lead pair. Consider, for example, a case for which $n=8$, in which each of the in-phase and quadrature-phase coders is a block coder of the type which receives each 8-bit word in the form of four 2-bit words sequentially applied thereto. In such a case, the 8 streams of differentially encoded bit pairs generated by differential encoding stage 114 could comprise four interleaved streams of bit pairs on leads 117a and 117b and four interleaved streams of bit pairs on leads 118a and 118b. Similarly, the 8 streams of data bits applied to differential encoding stage 114 could comprise four interleaved streams of data bit pairs on leads 112 and four interleaved streams of data bit pairs on leads 113.

Moreover, the invention is not limited to any particular circuit implementation—either for the differential encoders and decoders or the other components of the system in which the invention is used. Thus, for example, although the various components of the transmitter and receiver are shown as distinct physical elements, the individual or combined functions of any one or more of them could be performed by one or more appropriately programmed processors.

It will thus be appreciated that those skilled in the art will be able to device numerous arrangements which, although not explicity set forth herein, embody the principles of the invention.

What is claimed is:

1. Apparatus comprising
   coder means for generating in response to first and second streams of n-bit words applied to said coder means a stream of in-phase and quadrature-phase coder outputs, an individual one of said in-phase and quadrature-phase coder outputs being generated for each n-bit word in an associated one of said first and second streams, each in-phase and quadrature-phase coder output being a function of the values of predetermined ones of the bits exclusively in the associated one of said streams, and the coder output generated when each of said predetermined ones of said bits has a particular value being the negative of the coder output generated when each of said predetermined ones of said bits has its other value,
   means for receiving n streams of bit pairs,
   means for differentially encoding successive pairs of bits in each of said received streams to form n streams of differentially encoded bit pairs,
   means for applying to said coder means as each n-bit word of said first stream the first bit of a respective bit pair in each of said n differentially encoded streams and for applying to said coder means as each n-bit word of said second stream the second bit of said respective bit pair in each of said n differentially encoded streams, and
   means for applying a signal representing said data symbols to a transmission channel.

2. The invention of claim 1 wherein said differential encoding means differentially encodes each said successive pair of bits in each said received stream by generating for each different combination of the values of those bits a predetermined one of the differentially encoded bit pairs $(i,q)$, $(\bar{q},i)$, $(\bar{i},\bar{q})$ and $(q,\bar{i})$ associated with that combination, where $(i,q)$ is the previously-generated differentially encoded bit pair.

3. The invention of claim 1 wherein $n=2$ and wherein said coder means generates as the value of each said in-phase and quadrature-phase coder output the quantity $$X = b_3 + 2b_1b_3b_5 + 4b_2$$

where $$b_i = (-1)^{a_i} \text{ for } i=1,2,3,5$$

and where $a_1$ and $a_2$ are the bits of the most-recent 2-bit word in the stream associated with said each coder output, $a_3$ is the first bit in the previous 2-bit word in that stream and $a_5$ is the first bit in the 2-bit word previous to that.

4. The invention of claim 2 wherein $n=2$ and wherein said coder means generates as the value of each said in-phase and quadrature-phase coder output the quantity $$X = b_3 + 2b_1b_3b_5 + 4b_2$$

where $$b_i = (-1)^{a_i} \text{ for } i=1,2,3,5$$

and where $a_i$ is the $i^{th}$ most recently applied bit of the stream associated with said each component.

5. Apparatus comprising
   coder means for generating in response to first and second streams of n-bit words applied to said coder means in successive baud intervals a stream of in-phase and quadrature-phase coder outputs, an individual one of said in-phase and quadrature-phase coder outputs being generated for each n-bit word in an associated one of said first and second streams, each in-phase and quadrature-phase coder output beng a function of the values of predetermined ones of the bits exclusively coder output generated when each of said predetermined ones of said bits has a particular value being the negative of the coder output generated when each of said predetermined ones of said bits has its other value,
   means for receiving for each baud interval a data bit pair in each of n streams of data bit pairs,
   means for converting each data bit pair in the $j^{th}$ stream, $j=1, \ldots n$, to an associated differentially encoded bit pair by generating for each different combination of the values of the associated data bit pair a predetermined one of the differentially encoded bit pairs $(i_j, q_j)$, $(\overline{q_j}, i_j)$, $(\overline{i_j}, \overline{q_j})$ and $(q_j, \overline{i_j})$ associated with that combination, where $(i_j, q_j)$ is the differentially encoded bit pair associated with the previous data bit pair in said $j^{th}$ stream, means for applying to said coder means as said first stream the n-bit words comprised of the bits $(i_1, \ldots, i_n)$ generated for each baud interval and for applying to said coder means as said second stream the n-bit words comprised of the bits $(q_1, \ldots, q_n)$ generated for each baud interval, and means for applying a signal representing said data symbols to a transmission channel.

6. The invention of claim 5 wherein n=2 and wherein said coder means generates as the value of each said in-phase and quadrature-phase coder output the quantity $$X = b_3 + 2b_1 b_3 b_5 + 4b_2$$

where $$b_i = (-1)^{a_i} \text{ for } i=1,2,3,5$$

and where $a_1$ and $a_2$ are the bits of the most-recent 2-bit word in the stream associated with said each coder output, $a_3$ is the first bit in the previous 2-bit word in that stream and $a_5$ is the first bit in the 2-bit word previous to that.

7. Apparatus for use in a system of a type which includes coder means for generating in response to first and second streams of n-bit words applied to said coder means a stream of in-phase and quadrature-phase coder outputs, an individual one of said in-phase and quadrature-phase coder outputs being generated for each n-bit word in an associated one of said first and second streams, each in-phase and quadrature-phase coder output being a function of the values of predetermined ones of the bits exclusively in the associated one of said streams, and the coder output generated when each of said predetermined ones of said bits has a particular value being the negative of the coder output generated when each of said predetermined ones of said bits has its other value, means for differentially encoding successive pairs of bits in each of n applied data bit pair streams to form n streams of differentially encoded bit pairs, means for applying to said coder means as each n-bit word of said first stream the first bit of a respective bit pair in each of said n differentially encoded streams and for applying to said coder means as each n-bit word of said second stream the second bit of said respective bit pair in each of said n differentially encoded streams, and means for applying a signal representing said data symbols to a transmission channel, said apparatus comprising, means for receiving said signal from said channel and for recovering said first and second streams of n-bit words therefrom, means for forming n received differentially encoded bit pair streams, the bits of each word in said first stream of channel-decoded words each being the first bit of a respective bit pair in respective ones of said received differentially encoded streams and the bits of each word in said second stream of channel-decoded words each being the second bit of a respective bit pair in said respective ones of said received differentially encoded streams, and means for differentially decoding the pairs of bits in each of said received differentially encoded streams to recover said applied data bit streams.

8. The invention of claim 7 wherein n=2 and wherein said coder means generates as the value of each said in-phase and quadrature-phase coder output the quantity $$X = b_3 + 2b_1 b_3 b_5 + 4b_2$$

where $$b_i = (-1)^{a_i} \text{ for } i=1,2,3,5$$

and where $a_1$ and $a_2$ are the bits of the most-recent 2-bit word in the stream associated with said each coder output, $a_3$ is the first bit in the previous 2-bit word in that stream and $a_5$ is the first bit in the 2-bit word previous to that.

9. Apparatus for use in a system of a type which includes coder means for generating in response to first and second streams of n-bit words applied to said coder means in successive baud intervals a stream of in-phase and quadrature-phase coder outputs, an individual one of said in-phase and quadrature-phase coder outputs being generated for each n-bit word in an associated one of said first and second streams, each in-phase and quadrature-phase coder output being a function of the values of predetermined ones of the bits exclusively in the associated one of said streams, and the value of the coder output generated when each of said predetermined ones of said bits has a particular value being the negative of the coder output generated when each of said predetermined ones of said bits has its other value, means for receiving for each baud interval a data bit pair in each of n streams of data bit pairs, means for converting each data bit pair in the $j^{th}$ stream, $j=1,\ldots,n$, to an associated differentially encoded bit pair by generating for each different combination of the values of the associated data bit pair a predetermined one of the differentially encoded bit pairs $(i_j, q_j)$, $(\overline{q_j}, i_j)$, $(\overline{i_j}, \overline{q_j})$ and $(q_j, \overline{i_j})$ associated with that combination, where $(i_j, q_j)$ is the differentially encoded bit pair associated with the previous data bit pair in said $j^{th}$ stream, means for applying to said coder means as said first stream the n-bit words comprised of the bits $(i_1, \ldots, i_n)$ generated for each baud interval and for applying to said coder means as said second stream the n-bit words comprised of the bits $(q_1, \ldots, q_n)$ generated for each baud interval, and means for applying a signal representing said data symbols to a transmission channel, said apparatus comprising means for receiving said data symbols from said channel and for recovering said first and second streams of n-bit words therefrom, means for differentially decoding n streams of bit pairs for each baud interval, means for forming n received differentially encoded bit pair streams, the bits of each word in said first stream of channel-decoded words each being the first bit of a respective bit pair in respective ones of said received differentially encoded streams and the bits of each word in said second stream of channel-decoded words each being the second bit of a respective bit pair in said respective ones of said received differentially encoded streams.

10. The invention of claim 9 wherein n=2 and wherein said coder means generates as the value of each said in-phase and quadrature-phase coder output the quantity $$X = b_3 + 2b_1 b_3 b_5 + 4b_2$$

where $$b_i = (-1)^{a_i} \text{ for } i = 1,2,3,5$$

and where $a_1$ and $a_2$ are the bits of the most-recent 2-bit word in the stream associated with said each coder output, $a_3$ is the first bit in the previous 2-bit word in that stream and $a_5$ is the first bit in the 2-bit word previous to that.

* * * * *